United States Patent
Xie et al.

(10) Patent No.: US 11,768,105 B2
(45) Date of Patent: Sep. 26, 2023

(54) ELECTRONIC DEVICE

(71) Applicant: Beijing Xiaomi Mobile Software Co., Ltd., Beijing (CN)

(72) Inventors: Fei Xie, Beijing (CN); Jianglin Gu, Beijing (CN); Chunqiu Ji, Beijing (CN); Yue Chen, Beijing (CN)

(73) Assignee: Beijing Xiaomi Mobile Software, Co., Ltd., Beijing (CN)

( * ) Notice: Subject to any disclaimer, the term of this patent is extended or adjusted under 35 U.S.C. 154(b) by 17 days.

(21) Appl. No.: 17/585,895

(22) Filed: Jan. 27, 2022

(65) Prior Publication Data
US 2023/0032527 A1  Feb. 2, 2023

(30) Foreign Application Priority Data

Jul. 28, 2021  (CN) .......................... 202110857353.3

(51) Int. Cl.
*G01J 1/42*  (2006.01)
*G01J 1/04*  (2006.01)

(52) U.S. Cl.
CPC ........... *G01J 1/4204* (2013.01); *G01J 1/0407* (2013.01)

(58) Field of Classification Search
CPC .............................. G01J 1/4204; G01J 1/0407
See application file for complete search history.

(56) References Cited

U.S. PATENT DOCUMENTS

| | | | |
|---|---|---|---|
| 11,436,964 B1* | 9/2022 | Wang | G02B 6/0008 |
| 2021/0136189 A1 | 5/2021 | Yan et al. | |
| 2021/0181402 A1 | 6/2021 | Ota et al. | |
| 2022/0059050 A1* | 2/2022 | Thareja | G02B 5/223 |

FOREIGN PATENT DOCUMENTS

| | | | |
|---|---|---|---|
| CN | 208924284 U | 5/2019 | |
| CN | 109120752 B | 5/2020 | |

OTHER PUBLICATIONS

Extended European Search Report dated Jul. 7, 2022 for European Patent Application No. 22153952.1.

* cited by examiner

*Primary Examiner* — Kevin K Pyo
*Assistant Examiner* — Don J Williams
(74) *Attorney, Agent, or Firm* — Volpe Koenig

(57) ABSTRACT

The disclosure relates to an electronic device. The electronic device includes: a shell, a display panel, the display panel or the shell including a light-transmitting area, an ambient light sensor, an infrared transmitter and a light guiding piece. The light guiding piece includes a light incident end and a light emitting end, the light incident end being configured to face the light-transmitting area, and the light emitting end being configured to face the ambient light sensor and the infrared transmitter.

16 Claims, 4 Drawing Sheets

ELECTRONIC DEVICE

CROSS REFERENCE TO RELATED APPLICATION

The application is based on and claims priority to the Chinese Patent Application No. 202110857353.3, filed on Jul. 28, 2021, the entire content of which is incorporated herein by reference.

BACKGROUND

An ambient light sensor configured in an electronic device can sense the external ambient light intensity, so the display brightness of the electronic device can be adjusted. Moreover, when the quantity of the ambient light sensors configured in the electronic device increases, the detection range of an ambient light field can be greatly increased to reflect the ambient light situation around a mobile phone more truly. How to increase the quantity of the ambient light sensors and optimize the layout space of the electronic device simultaneously has become a technical problem to be solved.

SUMMARY

The disclosure relates to the technical field of terminals, and to an electronic device, to solve deficiencies in the related art.

According to an example of the disclosure, an electronic device is provided and includes: a shell; a display panel, the display panel or the shell including a light-transmitting area; an ambient light sensor; an infrared transmitter; and a light guiding piece including a light incident end and a light emitting end. The light incident end is arranged facing the light-transmitting area, and the light emitting end is arranged facing the ambient light sensor and the infrared transmitter.

BRIEF DESCRIPTION OF THE DRAWINGS

The drawings herein are incorporated into the specification and constitute a part of the specification, which show examples consistent with the disclosure, and are used together with the specification to explain the principle of the disclosure.

DETAILED DESCRIPTION

Examples will be described in detail herein, implementations of which are illustrated in the accompanying drawings. When the following description refers to the accompanying drawings, the same numbers in different drawings represent the same or similar elements unless otherwise indicated. The implementation examples described in the following examples do not represent all implementation examples consistent with the disclosure. On the contrary, they are merely examples of an apparatus or a method consistent with some aspects of the disclosure as detailed.

The terms used in the disclosure are only for the purpose of describing specific examples, and are not intended to limit the disclosure. The singular forms of "a", "an", and "the" used in the disclosure are also intended to include plural forms, unless the context clearly indicates other meanings.

It should be understood that although the terms "first", "second", etc. may be used in the disclosure to describe various information, the information should not be limited to these terms. These terms are only used to distinguish the same type of information from each other. For example, without departing from the scope of the disclosure, the first information may also be referred to as second information, and similarly, the second information may also be referred to as first information.

Figure 1:
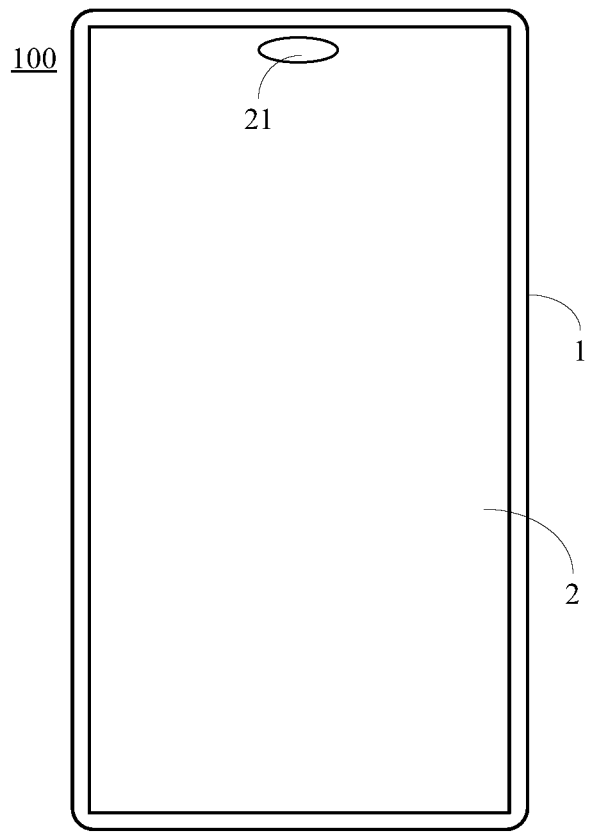
FIG. 1 is a schematic structural diagram of an electronic device shown according to an example.
Figure 2:
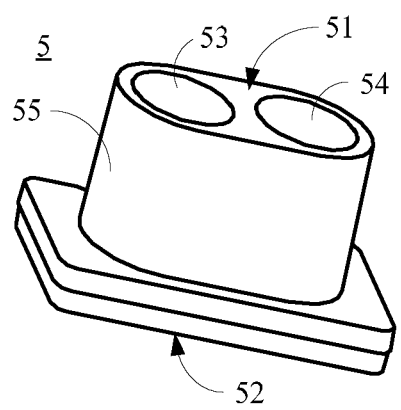
FIG. 2 is a schematic structural diagram of a light guiding piece shown according to an example.
Figure 3:
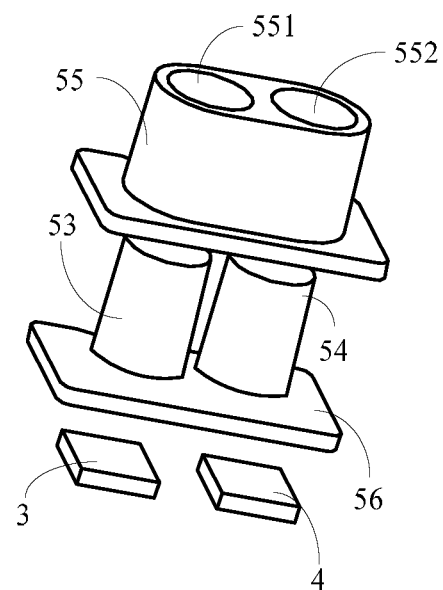
FIG. 3 is an exploded view chart of the light guiding piece in FIG. 2.

FIG. 1 is a schematic structural diagram of an electronic device 100 shown according to an example. FIG. 2 is a schematic structural diagram of a light guiding piece 5 shown according to an example. FIG. 3 is an exploded view chart of the light guiding piece 5 in FIG. 2. As shown in FIG. 1 to FIG. 3, the electronic device 100 may include a shell 1, a display panel 2, an ambient light sensor 3, an infrared transmitter 4 and a light guiding piece 5. The shell 1 may include a battery cover, a middle frame or a front shell. The display panel 2 may be connected with the front shell of the electronic device 100, so as to display an image through the display panel 2 which may include a light-transmitting area 21. The ambient light sensor 3, the infrared transmitter 4 and the light guiding piece 5 may all be arranged in the electronic device 100. For example, the ambient light sensor 3 and the infrared transmitter 4 may be connected to the shell 1 or other components in the electronic device 100, or the ambient light sensor 3 and the infrared transmitter 4 may also be connected and fixed to the light guiding piece 5. The external ambient light intensity of the electronic device 100 can be sensed through the ambient light sensor 3, and then the electronic device 100 can adjust the brightness of the display panel 2 according to the ambient light intensity. The infrared transmitter 4 can emit infrared light towards the outside of the electronic device 100, for example, a remote control or ranging function of the electronic device 100 can be achieved through the infrared light.

The light guiding piece 5 may include a light incident end 51 and a light emitting end 52. The light incident end 51 is configured facing the light-transmitting area 21 of the display panel 2, and the light emitting end 52 may be configured facing the ambient light sensor 3 and the infrared transmitter 4, so that the external ambient light can be transmitted to the ambient light sensor through the light-transmitting area 21 and the light guiding piece 5, while the infrared light emitted by the infrared transmitter 4 can also be emitted to the outside of the electronic device 100 through the light guiding piece 5 and the light-transmitting area 21. Based on this, the ambient light and the infrared light can be transmitted simultaneously through the light guiding piece 5. The ambient light sensor 3 and the infrared transmitter 4 can share the same light guiding piece 5, which is conducive to increasing the quantity of the ambient light sensors 3 for the electronic device 100, so as to improve the detection accuracy of the ambient light intensity, and further save the internal space of the electronic device.

The above description takes the display panel 2 including the light-transmitting area 21 as an example. In fact, in other examples, the light-transmitting area may also be formed on the shell 1, for example, an opening may be processed and formed in the shell 1 as the light-transmitting area, or an opening may be formed in a top of the shell 1 as the light-transmitting area. Compared with the solution of forming the light-transmitting area 21 on the display panel 2, the display area of the display panel 2 does not need to be occupied in the solution where the light-transmitting area is formed on the shell 1, and the light-transmitting area need not be arranged on a display side of the electronic device 100, which can improve the visual effect. And, when the light-transmitting area is located at the top of the electronic device 100, it is conducive to increasing the light field range of the ambient light sensor 3 and greatly improving the detection accuracy.

In the example, the ambient light sensor 3 and the infrared transmitter 4 can guide light through different light guiding channels of the light guiding piece 5 respectively. In one example, as still shown in FIG. 2 and FIG. 3, the light guiding piece 5 may include a first light guiding column 53, a second light guiding column 54 and a light-shielding body 55. The light-shielding body 55 may include a first mounting hole 551 and a second mounting hole 552. The first light guiding column 53 may be arranged in the first mounting hole 551, in which a first end of the first light guiding column 53 is configured facing the light-transmitting area 21, and a second end of the first light guiding column 53 is configured facing the ambient light sensor 3. The second light guiding column 54 may be arranged in the second mounting hole 552, in which a first end of the second light guiding column 54 may be configured facing the light-transmitting area 21, and a second end of the second light guiding column 54 may be configured facing the infrared transmitter 4. Based on this, an infrared light path of the infrared transmitter 4 and an ambient light path of the ambient light sensor 3 can be physically isolated to avoid light crosstalk and to avoid affecting the detection accuracy of the ambient light sensor 3. The light-shielding body 55 may include a non-light-transmitting polycarbonate light-shielding body, whereby external light is prevented from being emitted through sides of the first light guiding column 53 and the second light guiding column 54. The first light guiding column 53 may include a light-transmitting acrylic light guiding column, and the second light guiding column 54 may include a light-transmitting acrylic light guiding column.

Further, the light guiding piece 5 may further include a light guiding seat body 56, which is respectively connected with the first light guiding column 53, the second light guiding column 54 and the light-shielding body 55. The light guiding seat body 56 may further be connected with the shell 1 of the electronic device 100, so as to fix the light guiding piece 5 into the electronic device 100 and avoid moving. The ambient light sensor 3 and the infrared transmitter 4 may be connected to an end, facing away from the first light guiding column 53 and the second light guiding column 54 of the light guiding seat body 56, so as to achieve the purpose of light guidance through the first light guiding column 53 and the second light guiding column 54. The first light guiding column 53, the second light guiding column 54 and the light guiding seat body 56 may be integrally formed, or in other cases, the first light guiding column 53, the second light guiding column 54 and the light guiding seat body 56 may also be separately formed, and their relative positions and relationship may be fixed, e.g., by bonding or other means. The light guiding seat body 56 and the light-shielding body 55 may be fixedly connected by bonding.

Figure 4:
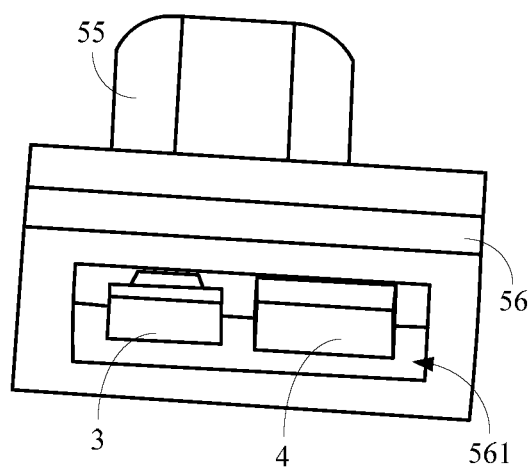
FIG. 4 is a schematic structural diagram of another light guiding piece shown according to an example.

In the example, as shown in FIG. 4, the light guiding seat body 56 may include a mounting groove 561 recessed from a side facing away from the light-shielding body 55, and the ambient light sensor 3 and the infrared transmitter 4 may both be located in the mounting groove 561, so that light can be converged by the surrounding effect of the mounting groove 561. Thus, compared with the solution that the light guiding seat body 56 is spaced from the ambient light sensor 3 and the infrared transmitter 4, the loss of the light can be reduced, and it is conducive to improving the detection accuracy of the ambient light sensor 3 and the remote control effectiveness of the infrared transmitter 4.

Figure 5:
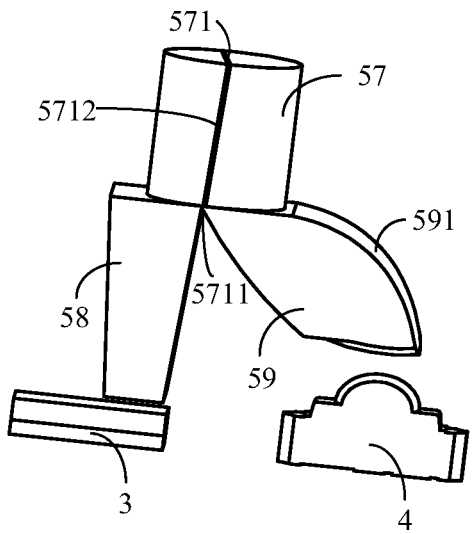
FIG. 5 is a schematic structural diagram of another light guiding piece shown according to an example.

In another example, as shown in FIG. 5, the light guiding piece 5 may include a shared part 57, a first light guiding sub-part 58 and a second light guiding sub-part 59. The first light guiding sub-part 58 and the second light guiding sub-part 59 are connected to a first end of the shared part 57, from which the first light guiding sub-part 58 and the second light guiding sub-part 59 extend in different directions respectively. An end, away from the shared part 57 of the first light guiding sub-part 58, is configured facing the ambient light sensor 3, and an end away from the shared part 57 of the second light guiding sub-part 59 is configured facing the infrared transmitter 4, so that the ambient light can be transmitted through the first light guiding sub-part 58, and the infrared light can be transmitted through the second light guiding sub-part 59. An end, away from the first light guiding sub-part 58 and the second light guiding sub-part 59 of the shared part 57, is configured facing the light-transmitting area 21.

In order to achieve the physical isolation of the ambient light path and the infrared light path on the shared part 57, as shown in FIG. 5, the shared part 57 may include a light-shielding boundary layer 571 including a first edge 5711 and two opposing second edges 5712. The first edge 5711 is located between the first light guiding sub-part 58 and the second light guiding sub-part 59, and the second edge 5712 extends in the height (or longitudinal) direction of the shared part 57 so as to be at least flush with a surface of the shared part 57. Based on this, the shared part 57 may be divided into two parts through the light-shielding boundary layer 571, so that one part may be connected with the first light guiding sub-part 58, and the other part may be connected with the second light guiding sub-part 59, so as to achieve the light path isolation of the ambient light and the infrared light on the shared part 57.

The shared part 57 includes a polycarbonate light-transmitting shared part. One part, connected with the first light guiding sub-part 58 and located on a side of the light-shielding boundary layer 571 of the polycarbonate light-transmitting shared part, may transmit the ambient light; and one part, connected with the second light guiding sub-part 59 and located on a side of the light-shielding boundary layer 571 of the polycarbonate light-transmitting shared part may transmit the infrared light. The first light guiding sub-part 58 may include a visible light guiding sub-part, and the second light guiding sub-part 59 may include an infrared light guiding sub-part.

Further, as still shown in FIG. 5, a sectional area of the first light guiding sub-part 58 (for example the surface area that is visible in the drawing at 58) may decrease progressively from an end close to the shared part 57 to an end away from the shared part 57. In other words, the closer the end of the first light guiding sub-part 58 to the ambient light sensor 3, the smaller the sectional area, so as to facilitate convergence of the ambient light irradiated from the outside. The second light guiding sub-part 59 may include an arc-shaped surface 591, which is located on a side away from the first light guiding sub-part 58 of the second light guiding sub-part 59. An emission direction of the infrared transmitter 4 points to the arc-shaped surface 591 from an end, away from the shared part 57 of the second light guiding sub-part 59, so that the infrared transmitter 4 may emit the infrared light towards the arc-shaped surface 591 of the second light guiding sub-part 59. Since the arc-shaped surface 591 can increase the area of a reflecting surface, more infrared light can be reflected, which is conducive to reducing the loss of the infrared light.

Figure 6:
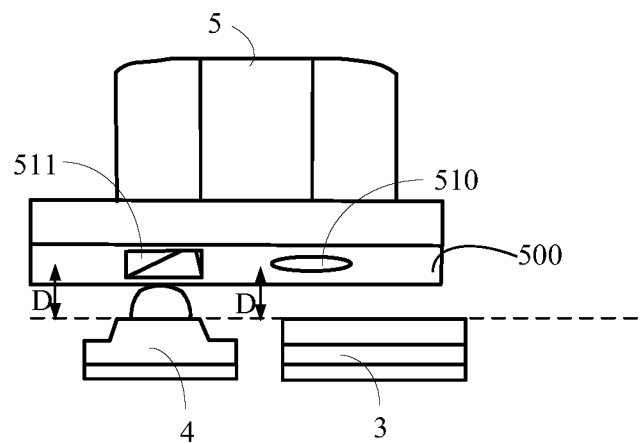
FIG. 6 is a schematic structural diagram of another light guiding piece shown according to an example.

In other cases, the ambient light sensor 3 and the infrared transmitter 4 may also share the same light guiding channel of the light guiding piece 5, so as to simplify a structure of the light guiding piece 5. For example, as shown in FIG. 6, the light guiding piece 5 may be an integrated light guiding column which may transmit infrared light and visible light. The integrated light guiding column includes a first lens part 510 and a second lens part 511 which are arranged on the light emitting end 52 (shown in FIG. 2). The first lens part 510 faces the ambient light sensor 3, and the second lens part 511 faces the infrared transmitter 4. Based on this, the loss of light can be reduced by using the condensing effect of the first lens part 510 and the second lens part 511.

Figure 7:
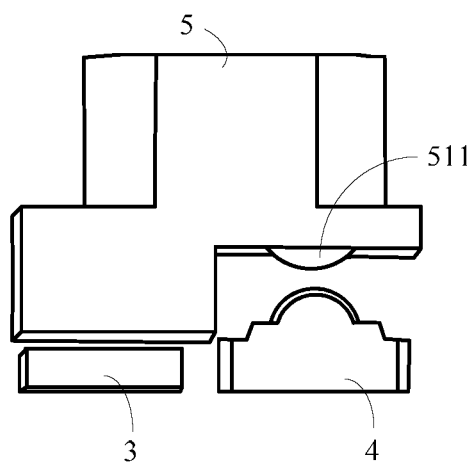
FIG. 7 is a schematic structural diagram of another light guiding piece shown according to an example.

In the example, when the ambient light sensor 3 and the infrared transmitter 4 have the same height, as shown in FIG. 6, an end 500, facing the ambient light sensor 3 and the infrared transmitter 4 of the integrated light guiding column, may be basically at the same height D. When an end facing the light guiding piece 5 of the ambient light sensor 3, and an end facing the light guiding piece 5 of the infrared transmitter 4 are located at different heights, as shown in FIG. 7, in a height (or longitudinal) direction of the integrated light guiding column, the height difference between the first lens part 510 (shown in FIG. 6) and the second lens part 511 may be greater than zero, so as to adapt to the ambient light sensor 3 and the infrared transmitter 4 in a manner conducive to the layout of other components in the electronic device 100.

After considering the specification and practicing the disclosure disclosed herein, those skilled in the art will easily think of other embodiments within the scope of the disclosure. The disclosure is intended to cover any variations, uses, or adaptive changes within the scope of the disclosure. These variations, uses, or adaptive changes follow the general principles of the disclosure and include common knowledge or conventional technical means in the technical field that are not disclosed in the disclosure.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An electronic device, comprising:
    a shell;
    a display panel, wherein the display panel or the shell comprises a light-transmitting area;
    an ambient light sensor;
    an infrared transmitter; and
    a light guiding piece comprising a light incident end and a light emitting end, wherein the light incident end is configured facing the light-transmitting area, and the light emitting end is configured facing the ambient light sensor and the infrared transmitter,
    wherein the light guiding piece comprises:
    a light-shielding body comprising a first mounting hole and a second mounting hole;
    a first light guiding column arranged in the first mounting hole, wherein a first end of the first light guiding column is configured facing the ambient light sensor, and a second end of the first light guiding column is configured facing the transparent area; and
    a second light guiding column arranged in the second mounting hole, wherein a first end of the second light guiding column is configured facing the infrared transmitter, and a second end of the second light guiding column is configured facing the transparent area.

2. The electronic device of claim 1, wherein the ambient light sensor and the infrared transmitter share a light guiding channel of the light guiding piece.

3. The electronic device of claim 1, wherein the ambient light sensor and the infrared transmitter respectively correspond to different light guiding channels of the light guiding piece.

4. The electronic device of claim 1, wherein the light guiding piece further comprises a light guiding seat body connected with the shell, wherein the light guiding seat body is respectively connected with the first light guiding column, the second light guiding column and the light-shielding body, and the ambient light sensor and the infrared transmitter are located on a side, facing away from the first light guiding column and the second light guiding column, of the light guiding seat body.

5. The electronic device of claim 4, wherein the light guiding seat body comprises a mounting groove recessed from a side facing away from the light-shielding body, and the ambient light sensor and the infrared transmitter are located in the mounting groove.

6. The electronic device of claim 1, wherein the light-shielding body comprises a non-light-transmitting polycarbonate light-shielding body.

7. The electronic device of claim 1 wherein the first light guiding column and the second light guiding column respectively comprise a light-transmitting acrylic light guiding column.

8. The electronic device of claim 1,
    wherein the light guiding piece comprises a shared part, a first light guiding sub-part and a second light guiding sub-part,
    wherein the first light guiding sub-part and the second light guiding sub-part are connected to a first end of the shared part and extend in different directions, and a second end of the shared part is configured facing the light-transmitting area,
    wherein an ambient light path and an infrared light path on the shared part are physically isolated, and
    wherein the first light guiding sub-part is configured facing the ambient light sensor, and the second light guiding sub-part is configured facing the infrared transmitter.

9. The electronic device of claim 8, wherein the shared part comprises a light-shielding boundary layer comprising a first edge and two opposing second edges, wherein the first edge is located between the first light guiding sub-part and the second light guiding sub-part, and the second edge extends in a height direction of the shared part until to be at least flush with a surface of the shared part.

10. The electronic device of claim 8, wherein a sectional area of the first light guiding sub-part decreases progressively from an end close to the shared part to an end away from the shared part.

11. The electronic device of claim 8, wherein the second light guiding sub-part comprises an arc-shaped surface located on a side away from the first light guiding sub-part of the second light guiding sub-part, and an emission direction of the infrared transmitter points to the arc-shaped surface from an end away from the shared part of the second light guiding sub-part.

12. The electronic device of claim 8, wherein the shared part comprises a polycarbonate light-transmitting shared part.

13. The electronic device of claim 8, wherein the first light guiding sub-part comprises a visible light guiding sub-part, and the second light guiding sub-part comprises an infrared light guiding sub-part.

14. The electronic device of claim 1, wherein the light guiding piece comprises an integrated light guiding column capable of transmitting infrared light and visible light, wherein the integrated light guiding column comprises:
   a first lens part arranged on the light emitting end, wherein the first lens part faces the ambient light sensor, and
   a second lens part arranged on the light emitting end, wherein the second lens part faces the infrared transmitter.

15. The electronic device of claim 14, wherein in a height direction of the integrated light guiding column, a height difference between the first lens part and the second lens part is greater than zero.

16. The electronic device of claim 14, wherein an end facing the ambient light sensor 3 is at the same height as the infrared transmitter 4 of the integrated light guiding column.

* * * * *

UNITED STATES PATENT AND TRADEMARK OFFICE
CERTIFICATE OF CORRECTION

PATENT NO. : 11,768,105 B2
APPLICATION NO. : 17/585895
DATED : September 26, 2023
INVENTOR(S) : Fei Xie et al.

It is certified that error appears in the above-identified patent and that said Letters Patent is hereby corrected as shown below:

In the Claims

In Column 6, Line 38, in Claim 7, delete "claim 1" and insert -- claim 1, --, therefor.

Signed and Sealed this
Nineteenth Day of December, 2023

Katherine Kelly Vidal
Director of the United States Patent and Trademark Office